United States Patent [19]

Mackenzie et al.

[11] 4,448,599

[45] May 15, 1984

[54] HOLLOW SPHERES PRODUCED FROM NATURAL ZEOLITES

[75] Inventors: John D. Mackenzie; Tetsuro Horiuchi, both of Los Angeles, Calif.

[73] Assignee: Atlantic Richfield Company, Los Angeles, Calif.

[21] Appl. No.: 360,705

[22] Filed: Mar. 22, 1982

[51] Int. Cl.³ .......................... C03B 19/10; C03C 3/04
[52] U.S. Cl. ........................................ 65/21.4; 501/33; 501/39
[58] Field of Search .......................... 65/21; 501/33, 39

[56] References Cited

U.S. PATENT DOCUMENTS

| | | | |
|---|---|---|---|
| 2,639,132 | 5/1953 | Bradford | 252/378 R |
| 2,676,892 | 4/1954 | McLaughlin | 501/85 |
| 2,797,201 | 6/1957 | Veatch et al. | 501/85 |
| 3,030,215 | 4/1962 | Veatch et al. | 501/33 |
| 3,129,086 | 4/1964 | Veatch et al. | 264/14 |
| 3,365,315 | 1/1968 | Beck et al. | 501/33 |
| 3,794,503 | 2/1974 | Netting | 106/75 |
| 3,838,998 | 10/1974 | Matthews et al. | 501/33 |

*Primary Examiner*—Mark Bell
*Attorney, Agent, or Firm*—Trask & Britt

[57] ABSTRACT

A process is described for the formation of hollow glassy generally spherical particles ("microspheres") from natural mineral zeolites. A zeolite (or a mixture of zeolites) is rapidly heated to a temperature above its liquidus temperature to melt its surfaces, vaporize its combined water and cause it to expand to form the microspheres. The microspheres have diameters in the range of 1 to 500 millimeters and densities of about 0.1 to 2.0 g/cm³. They are useful as fillers and extenders in many materials such as plastics, and, because of their resistance to alkaline attack, are especially useful as fillers in cementitious materials.

8 Claims, No Drawings

HOLLOW SPHERES PRODUCED FROM NATURAL ZEOLITES

BACKGROUND OF THE INVENTION

The invention herein relates to hollow glassy spheres (sometimes referred to as "microspheres" or "microballoons") and the production thereof.

In the past generally spherical inorganic hollow particles have been produced in a variety of different manners and from several different types of materials. U.S. Pat. No. 2,676,892 discloses a process for the formation of hollow spheres from high melting point naturally occurring argillaceous materials such as clay. These materials are first dried, removing free water and, if desired, also the small (about 4–5 weight percent) of combined water. The dried materials are then powdered and then suspended in a hot gaseous medium at temperatures of about 1100° to 2200° C., usually 1400° to 2200° C., to expand the argillaceous particles. Because of the high fusion temperature of the materials and the scarcity or complete lack of water therein, the process described in the patent relies entirely on the reduction of ferric oxide in the materials to yield oxygen as a gaseous expanding agent. In order for the process to work the ferric oxide content must be at least 2 weight percent, preferably about 6 weight percent. It is reported (in subsequent U.S. Pat. No. 3,030,215) that the spherical particles produced in this process are "of poor uniformity, of relatively high density, and . . . of an uneven and irregular surface . . . ".

The aforesaid U.S. Pat. No. 3,030,215 describes a process for forming spheres from a mixture of an alkali metal silicate, an oxide silicate insolubilizing agent and a solid blowing agent. Considerable preparation of the feed material, including slurrying and drying of the silicate, is required. A somewhat similar process is shown in the U.S. Pat. No. 3,794,503, which involves the formation of spheres by spray drying of a mixed solution of an alkali metal silicate and an organic polysalt.

U.S. Pat. No. 3,365,315 describes a two-step process for forming hollow glass spheres from conventional glass forming mixtures of oxides. The oxides are first melted to form a glass and then cooled and solidified. They are then subjected to a high humidity or gaseous atmosphere to adsorb or absorb sufficient gas forming material to be expanded in a subsequent reheating step. A solid gas forming material may as an alternative be incorporated into the initial glass, which will in the subsequent reheating step liberate a gaseous blowing agent. While the glass spheres so produced are relatively uniform and of good quality, the addition of a liquid or gaseous material to a glass melt is a very difficult operation and hazardous when high temperatures are involved. The necessity to utilize two distinct heating steps separated by a cooling step also represents a significant degree of complexity.

U.S. Pat. Nos. 2,797,201 and 3,129,086 disclose the expansion of spheres from a film forming material by use of a latent gas material dissolved in a suitable solvent.

It will be recognized that these prior art processes involve the use of complex or hazardous production methods, require very specialized raw materials or produce unsatisfactory end products. It would therefore be advantageous to have a process for the formation of hollow glassy spheres of good quality which is simple to perform, utilizes readily available raw materials, does not involve exotic or hazardous operating methods and produces a satisfactory end product in good yield.

It has also been known in the past that perlite, a rhyolitic volcanic glass, can be expanded into irregular shapes by rapid heating. Powdered perlite is passed rapidly through a high temperature zone and the heat causes the combined water in the perlite to convert rapidly to steam, causing the perlite to "pop" and form hollow irregular particles. A typical process is described in U.S. Pat. No. 2,639,132. Perlite expansion, however, is based on different mechanism from the zeolite expansion of this invention. Perlite, which is vitreous rather than crystalline, expands by softening rather than melting, and therefore expands over a range of temperatures, which results in the irregularities and fractions in the expanded perlite product. Perlite also has a highly variable water content, which leads to irregularities and fractures in the product.

SUMMARY OF THE INVENTION

The invention herein comprises hollow glassy spherical particles (of the type commonly known as microspheres) which are produced by the rapid heating of particles of natural mineral zeolites. In this process the zeolite particles are heated under time and temperature conditions sufficient to cause a significant fraction of the zeolite particles to reach their liquidus temperature and expand under the influence of vaporized contained water to form hollow glassy spheres. Typically the particles will be heated for a period of 0.001 to 10.0 seconds in a gaseous atmosphere having a temperature in the range of 900° to 1700° C. Following expansion the expanded spheres are quenched with air or other cool gas or with water to solidify them.

The invention herein also comprises the hollow glassy spheres so formed.

DETAILED DESCRIPTION AND PREFERRED EMBODIMENTS

The hollow glassy spheres of the present invention are formed using natural mineral zeolites as the raw material. The natural mineral zeolites are a group of hydrous alkali and/or alkaline earth aluminosilicates which have an open three-dimensional crystalline framework. While a large number of individual mineral zeolites are known and have been described in the literature, eleven minerals make up the major group of mineral zeolites: analcime, chabazite, clinoptilolite, erionite, ferrierite, heulandite, laumontite, mordenite, natrolite, phillipsite and wairakite. The chemical and physical properties of these major mineral zeolites, as well as the properties of many of the minor mineral zeolites, are described extensively in LeFond (ed.), *Industrial Minerals and Rocks* (4th edn., 1975), pp. 1235–1274; Breck, *Zeolite Molecular Sieves* (1974), especially Chapter 3; and, Mumpton (ed.), *Mineralogy and Geology of Natural Zeolites*, Vol. 4 (Mineralogical Society of America: November 1977). These publications also describe the geologic occurrence of the natural mineral zeolites and some industrial and agricultural uses which have been proposed or in which the natural mineral zeolites are now being used commercially.

It is important to note that the natural mineral zeolites are an entirely different class of materials from the "synthetic zeolites" which have been widely described in many recent articles and patents. Because there is no universally recognized system for naming the synthetic zeolites, and because some of the synthetic materials exhibit x-ray diffraction patterns which suggest possible similarities in structure with the natural mineral zeolites, some reports in the literature and patents have described certain synthetic zeolites as "synthetic" versions of the natural mineral zeolites. Thus, for instance, certain synthetic zeolites have been described as "synthetic analcime" or "synthetic mordenite" and so forth. As noted in the aforementioned Breck reference, however, this approach is technically unsound and has merely led to confusion between the two otherwise distinct classes of materials: the natural mineral zeolites and synthetic zeolites. While it has been recognized that there are structural similarities between the two groups, it is clear that the natural mineral zeolites constitute a class of materials significantly separate and distinct in structure and properties from the synthetic zeolites.

The zeolite raw materials herein may be any one of the above major or other minerals, or mixtures thereof. Mixtures are common, since most zeolite deposits contain more than one mineral species and it is usually neither technically nor economically feasible to separate them. Other mixtures may be formed by the user. Many such mixtures are desirable, since the mixtures may possess physical properties (color, density, refractoriness, etc.) not possessed by the individual species alone.

While the chemical compositions of the zeolites vary depending on the particular mineral species and the ore body from which the mineral is obtained, generally the zeolites are predominantly siliceous with alumina and calcia representing the other major oxides present. The zeolites, therefore, tend to exhibit glass-like properties. Critical to the present invention, however, is the combined water content of the mineral zeolites, which normally is in the range of about 10 to 20 percent by weight. It is this combined water content that makes the zeolites such uniquely suitable materials for formation of the microspheres, since the presence of the combined water eliminates the need to incorporate liquids or gases into molten glass compositions or films as has been necessary in the prior art processes.

For the present process to be properly operated, a sufficient combined water content of the zeolites must be maintained until the formation of the spheres. Thus, zeolites which have been allowed to become severely desiccated will not properly expand to form a satisfactory yield of hollow spheres when heated to the operating temperatures of the process. However, zeolites which have been desiccated can usually have their combined water contents raised to appropriate levels by placing them in high humidity atmospheres for periods of time sufficient to enable the zeolites to take up moisture from the atmosphere. It may also be desirable in some cases deliberately to expose the zeolites to high humidity to raise their water content to improve expansion. In experiments water contents up to 43 weight percent have been obtained. It is important that the added water be present as combined or adsorbed water rather than as a surface film, for the latter will cause the zeolite particles to stick together during expansion.

Since the zeolites are crystalline rather than vitreous, they do not melt or soften until the liquidus temperature is reached and then they melt essentially isothermally. Consequently the desired temperature of exposure for expansion of a given sample of zeolite is a temperature slightly above the liquidus temperature for that sample. Usually this will be a temperature in the range of 900° to 1700° C., preferably 1300° to 1500° C. It is important that the zeolites be subjected to this temperature for a short period, usually less than 10.0 seconds, preferably about 1.0 seconds or less. If the temperature exposure is greater, the spheres formed will melt and collapse or will fuse together to form irregular solid aggregates. In both cases the desirable properties of the hollow spheres will be lost.

On the other hand, the exposure time must be sufficient to permit the surface of the zeolites to reach the liquidus temperature and the combined water to flash to steam, to effect the expansion of the zeolite particles to the hollow spheres. Generally, the minimum exposure time will be on the order of about 0.001 seconds. Both the minimum and maximum exposure times for any particular zeolite samples will be determined by simple experimentation based on these approximate values. The optimum exposure time for any given zeolite will be a function of such factors as the refractoriness of the zeolite composition, the combined water content, the temperature within the expansion zone, and the particle size of the zeolite raw material.

It is preferred that the zeolites not be heated slowly through intermediate temperatures prior to reaching the expansion temperature. If such slow heating occurs, much if not all of the combined water can be lost through a drying mechanism rather than a rapid steam vaporization mechanism, and reduced expansion of the zeolite will subsequently occur.

The hollow microspheres formed by this process will be generally spherical in shape with diameters in the range of from 1 to 500 micrometers. In order to obtain these product sizes, the zeolite raw materials will normally be reduced (as by grinding) to characteristic particle sizes in the range of 0.1 to 100 micrometers. While larger or smaller raw material particle sizes may be used, they are undesirable, for such particles are often difficult to expand uniformly or tend to be retained in the expansion zone too long and become overly melted, collapsed or fused.

The degree of uniformity in the size of the hollow spheres will be to a large extent dependent on the degree of uniformity in the original zeolite raw material particle sizes. If narrow ranges of particle sizes are desired in the end product spheres, the zeolite raw material particle sizes can be screened to select as raw materials only a narrow range of particle sizes. Alternatively, a wider range of raw material particle sizes can be used and the end product spheres screened, air classified or otherwise divided into size fractions.

The hollow sphere products of the present invention will normally have bulk (apparent) densities in the range of about 0.1 to 2.0 g/cm$^3$. Density can be varied widely to obtain the physical properties desired, such as crush strength, for particular applications. This makes the spheres ideally suited for use as low density aggregates, fillers, insulations and the like. The chemical composition of the spheres will be essentially that of the zeolite raw materials, except that the original combined water will have been substantially reduced and any volatile materials originally present in the zeolite raw material will normally have been driven off.

A most interesting property of the zeolite-based microspheres of this invention is their resistance to alkaline attack. This resistance makes them suitable for use in alkaline matrices such as portland cement, where other glassy microspheres derived from conventional glass compositions are not usable.

It is possible in many cases to cause the microspheres, which are normally white or light tan in color, to take on other colors. This is accomplished by mixing small amounts of solid coloring agents into the feed with the powdered zeolites and having them become incorporated into the zeolites during expansion. We have achieved a blue color using cobalt and believe other colors can be readily obtained, such as red through use of selenium or green with copper.

The expansion of the zeolites to form the hollow spheres in the present process can be accomplished with different types of equipment. For instance, one may use a simple cylindrical furnace having a hollow core extending vertically through the furnace. The zeolite raw material particles are simply dropped into the top of the furnace and fall freely through the hollow core, in which they are expended to the hollow spheres which are in turn collected at the bottom of the furnace. Collection in a container of water is quite convenient, since the lower density spheres will simply float on the water surface and can be easily recovered. The water also serves to quench the spheres if they have not previously been air or gas quenched entirely. The length of the hollow core is calculated to provide sufficient residence time at the desired temperature for the freely falling particles. Other suitable equipment which may be used would include expansion furnaces similar to those used for perlite expansion (see, e.g., aforesaid U.S. Pat. No. 2,639,132). Such furnaces are hollow and have a flame zone along the center vertical axis with the flame generated by a burner at the bottom of the furnace. The zeolite particles are dropped into the furnace above the flame zone and would fall freely into the flame zone. Upon expansion, with the reduced density resulting therefrom the expanded particles will be entrained in the flow of combustion gases and carried upward and out the top of the hollow furnace to external collection means. Non-vertical furnaces may also be used where rapidly moving streams of air or other heated gas convey the particles through an expansion zone in a horizontal or other angled flow path. Because of the simplicity inherent in gravity flow and free fall of the particles, and since there is a well established body of technology regarding vertical perlite expanders, it is preferred that the furnace expansion system used be a vertical system, either one in which the particles fall completely through the furnace or in which they fall into a rising gas stream which conveys them out of the top of the furnace.

The gas used to provide the heated expansion atmosphere is most suitably air but may, if desired, be any other hot gas which is not deleterious to properties of the expanded spheres. Thus, combustion gases may be used or waste heat gases from other processes. On the other hand, corrosive gases should be avoided. It may in some cases be desirable to use as the expansion medium a gas which is reactive with the surfaces of the expanded spheres, in order to modify the surface or other properties of the microsphere particles. Heating of the air or other gas atmosphere may be by fuel gas burners, electric radiation elements or other conventional heating means, such as a source of gas heated to an appropriate temperature in another process and conveyed to the expansion zone without undue loss of heat content.

Quenching of the spheres after expansion may be accomplished simply by letting them be exposed to air or gas at temperatures below the zeolite liquidus temperature. Thus commonly occurs as a matter of course as the expanded particles exit from the expansion zone, but addition cooling and quenching means may be provided is desired.

In operation of this process, approximately 10 to 90 percent of the zeolite feed particles can be expanded to suitable microsphere products. It is usually difficult, however, to exceed about 80 percent conversion, since the amount of heat required to convert the most refractory of the feed particles is generally an amount which also tends to overheat and collapse the least refractory expanded spheres, so that the resulting added yield of expanded refractory particles is offset by loss of the least refractory microspheres. Yields can be increased by conducting the process in a plurality of stages, each stage having a successively higher temperature. Between each of the stages the expanded spheres are separated and the unexpanded (and more refractory) zeolite feed particles conveyed to the next section for expansion at the higher temperature without risk of loss of the less refractory previously expanded spheres. Some limitation on yield of hollow spheres remains, however, since the successive heating also effects a measure of drying of the unexpanded particles so that there is less tendency for the particles to expand in the subsequent stages, as discussed above.

To illustrate the present process and the products resulting therefrom, laboratory scale experiments were conducted using annular vertical cylindrical radiative furnaces having hollow cores of 2 to 6 feet (0.6–1.8 m) in length and 2 to 6 inches (5 to 15 cm) in diameter. The samples tested were primarily mixtures of mordenite and clinoptilolite mineral zeolite species, with lesser amounts of amorphous silica and yet lesser amounts of crystalline silica and other gangue materials. The raw materials were ground as described above and dropped into the flame zone within the furnace core. Upon expansion the microspheres became entrained in a rising gas stream generated by means below the furnace and were carried out of the top of the furnace and over to a nearby water collection vessel, where they were collected on the water surface. Yields of approximately 10 to 30 percent conversion to hollow spheres having densities less than 1.0 g/cm$^3$ were obtained. It should be noted that the yields were much higher for all expanded particles, since many had densities slightly greater than 1.0 g/cm$^3$ and thus while satisfactorily expanded did not float on the water and thus were not collected for measurement in these experiments. The expanded spheres had diameters in the range of from 30 to 100 micrometers, and were found to be generally regular in shape and essentially spherical.

The products of this process are capable of use in a number of important industrial applications. One principal application is as fillers in plastics and resins, to minimize the amount of expensive resin which must be used to form a molded product while yet retaining the desirable physical properties of the molded plastic. The spheres may also be used as lightweight spacers and insulation in hollow walls of containers. Their alkali resistance makes them highly suitable for use as lightweight fillers in cementitious matrices.

We claim:

1. A process for the formation of hollow glassy generally spherical particles which comprises rapidly heating natural mineral zeolite particles to a temperature above the liquidus temperature of the particles for a time sufficient to melt the surfaces of the particles and cause the combined water present in the particles to be rapidly vaporized, whereby the particles expand and form said hollow glassy particles, and the hollow glassy particles are thereafter quenched in an ambient atmosphere at a temperature below said liquidus temperature.

2. A process as in claim 1 wherein said temperature is in the range of 900° to 1700° C.

3. A process as in claim 2 wherein said temperature is in the range of 1300° to 1500° C.

4. A process as in claims 1, 2 or 3 wherein said zeolite particles initially at ambient temperature are exposed to said elevated temperature for a period in the range of from about 0.001 to about 10.0 seconds.

5. A process as in claim 1 wherein said zeolite particles comprise the minerals analcime, chabazite, clinoptilolite, erionite, ferrierite, heulandite, laumontite, mordenite, natrolite, phillipsite and wairakite and mixtures thereof.

6. A process as in claim 1 wherein said zeolite particles have sizes in the range of from about 0.1 to about 100 micrometers.

7. A process as in claims 1 or 2 wherein said heating is effected while the zeolite particles fall vertically by gravity within a hollow furnace.

8. A process as in claim 7 wherein the hollow spheres are formed within a heated flame zone in a furnace containing a combustible fuel burner and after formation are conveyed out of the furnace entrained in the combustion gases from said burner.

* * * * *